United States Patent
Brown

(10) Patent No.: US 7,902,979 B2
(45) Date of Patent: Mar. 8, 2011

(54) DIRECTED ENERGY BEAM VIRTUAL FENCE

(75) Inventor: Kenneth William Brown, Yucaipa, CA (US)

(73) Assignee: Raytheon Company, Waltham, MA (US)

( * ) Notice: Subject to any disclaimer, the term of this patent is extended or adjusted under 35 U.S.C. 154(b) by 301 days.

(21) Appl. No.: 12/101,836

(22) Filed: Apr. 11, 2008

(65) Prior Publication Data

US 2009/0256706 A1 Oct. 15, 2009

(51) Int. Cl.
*G08B 13/18* (2006.01)

(52) U.S. Cl. ......... 340/552; 340/551; 340/555; 340/556; 340/557; 340/521; 348/143; 348/164; 362/518; 362/522; 250/491.1; 250/503.1; 250/504 R

(58) Field of Classification Search .......... 340/552, 340/551, 555, 556, 557, 521; 348/143, 164; 362/518, 522; 250/491.1, 503.1, 504 R
See application file for complete search history.

(56) References Cited

U.S. PATENT DOCUMENTS

| | | | | |
|---|---|---|---|---|
| 3,623,057 | A * | 11/1971 | Hedin et al. | 340/557 |
| 3,641,549 | A | 2/1972 | Misek et al. | |
| 3,711,846 | A * | 1/1973 | Schlisser et al. | 340/557 |
| 4,132,988 | A | 1/1979 | Blacksmith et al. | |
| 4,910,498 | A * | 3/1990 | Feher | 340/556 |
| 5,195,060 | A * | 3/1993 | Roll | 367/118 |
| 6,259,365 | B1 * | 7/2001 | Hagar et al. | 340/557 |
| 6,424,259 | B1 | 7/2002 | Gagnon | |
| 6,466,157 | B1 | 10/2002 | Bjornholt | |
| 6,922,145 | B2 | 7/2005 | Piesinger | |
| 6,950,021 | B2 | 9/2005 | Butler | |
| 7,126,477 | B2 | 10/2006 | Gallivan | |
| 2006/0238617 | A1 * | 10/2006 | Tamir | 348/143 |
| 2007/0040725 | A1 | 2/2007 | Lowell | |
| 2007/0139247 | A1 | 6/2007 | Brown | |
| 2008/0231471 | A1 * | 9/2008 | Thorsted | 340/952 |

FOREIGN PATENT DOCUMENTS

| | | |
|---|---|---|
| EP | 0 908 859 A1 | 4/1999 |
| EP | 0908859 A1 | 4/1999 |
| JP | 2006-018485 | 1/2006 |
| JP | 2006018485 | 1/2006 |
| WO | WO 93/00003 | 1/1993 |

OTHER PUBLICATIONS

Raytheon, Silent Guardian, Jun. 2006.
Wikipedia, Active Denial System, 2007.
Riu, Foster, Blick, Adair, A thermal model for human thresholds of microwave-evoked warmth sensation, 1996.
Blick, Adair, Hurt, Sherry, Walters, Merritt, Thresholds of microwave-evoked warmth sensation in human skin, 1997.

(Continued)

*Primary Examiner* — Tai T Nguyen
(74) *Attorney, Agent, or Firm* — SoCal IP Law Group LLP; John E. Gunther; Steven C. Sereboff

(57) ABSTRACT

There is disclosed apparatus and methods for a directed energy beam virtual fence. The directed energy beam virtual fence may include a source unit to provide an energy beam and a sequence of relay units disposed at intervals along the length of the virtual fence. Each relay unit in the sequence may receive the energy beam from a previous unit and may recollimate and redirect the energy beam towards a subsequent unit.

17 Claims, 7 Drawing Sheets

OTHER PUBLICATIONS

Walters, Ryan, Nelson, Blick, Mason, Effects of blood flow on skin heating induced by millmeter wave irradiation in humans, 2004.
Walters, Blick, Johnson, Adair, Foster, Heating and pain sensation produced in human skin by millimeter waves: comparison to a simple thermal model, 2000.
European Patent Office International Searching Authority Partial International Search Report in PCT/US2009/037155, dated Jun. 2, 2009.
European Patent Office, International Search Report and Written Opinion of the International Searching Authority for International Application No. PCT/US2009/037155, Mail Date Sep. 4, 2009.
JNLWD Public Affairs, Joint Non-Lethal Weapons Program "Active Denial System (ADS)" Fact Sheet, Oct. 2007.
Riu et al., A thermal model for human thresholds of microwave-evoked warmth sensation, 1996.
Blick et al., Thresholds of microwave-evoked warmth sensation in human skin, 1997.
Walters et al., Effects of blood flow on skin heating induced by millimeter wave irradiation in humans, 2004.
Walters et al., Heating and pain sensation produced in human skin by millimeter waves: comparison to a simple thermal model., 2000.

* cited by examiner

DIRECTED ENERGY BEAM VIRTUAL FENCE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to directed energy weapons and to directed energy weapons employing a high power millimeter-wave directed energy beam in particular.

2. Description of the Related Art

Millimeter-wave directed energy beams are a known method for repelling or deterring intruders. A millimeter-wave beam, such as a W-band millimeter-wave beam having frequency about 94 GHz, may penetrate the skin of an intruder person to only a depth of $1/64^{th}$ of an inch. The millimeter-wave energy may heat the outer portion of the skin containing nerve endings, and thus cause intense temporary pain without any permanent damage to the intruder.

Portable and mobile millimeter-wave directed energy non-lethal weapons have been proposed for use in riot suppression and other applications. Stationary millimeter-wave directed energy non-lethal weapons have been proposed for deterring unwanted persons from entering protected areas.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
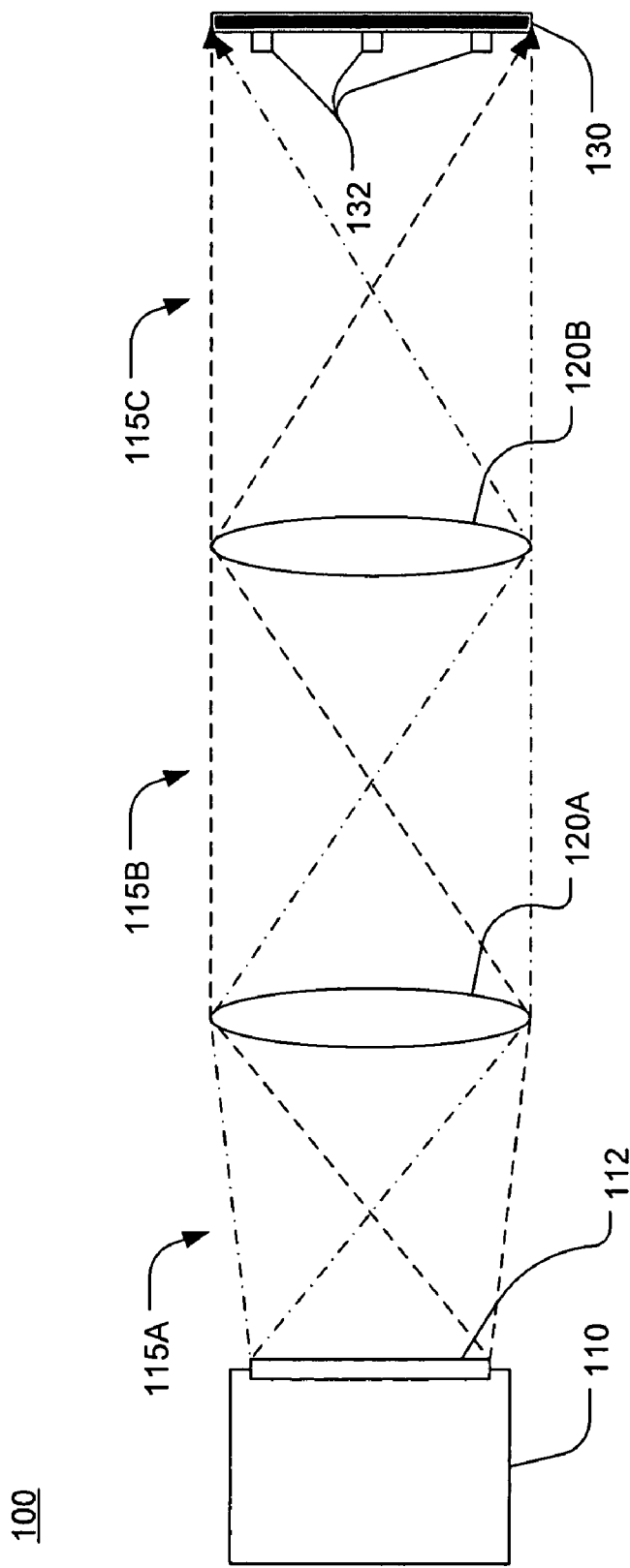
FIG. 1 is an optical schematic of a directed energy beam virtual fence.

Referring now to FIG. 1, a simplified optical schematic of a directed energy beam virtual fence 100 may include a source unit 110, a first relay unit 120A, and a second relay unit 120B. The source unit 110 may provide an energy beam 115A. The frequency of the energy beam may be about 94 GHz, such that the beam may be transmitted through the atmosphere with relatively low loss due to the atmospheric radio window centered at 94 GHz. The frequency of the beam may be 94±1 GHz. The cross-sectional extent of the energy beam 115A at the source unit may be defined by a source unit exit aperture 112.

Although the first relay unit 120A and the second relay unit 120B are illustrated schematically as lenses, the relay units for high power energy beams may be comprised of reflective elements rather than lenses.

The first relay unit 120A may receive the energy beam 115A from the source unit 110. The first relay unit 120A may recollimate the received energy beam 115A and direct the recollimated energy beam 115B toward the second relay unit 120B. In this context, the term "recollimate" is intended to mean to reshape the wavefront of the energy beam 115A to reduce the beam divergence to increase the amount of energy that is actually delivered to the second relay unit 120B. Similarly, the second relay unit 120B may receive the energy beam 115B from the first relay unit. The second relay unit may again recollimate the energy beam and direct the recollimated beam 115C to a beam terminator 130. The beam terminator 130 may receive and absorb the energy beam 115C. The beam terminator 130 may include one or more detectors 132 to measure the power level of the energy beam 115C and thus determine if the energy beam has been interrupted or partially interrupted at any point along the beam path.

To conserve energy, the power source unit 110 may generate a low power energy beam 115A until a determination is made, using detectors 132, that the energy beam has been at least partially interrupted. Upon determination that the energy beam has been interrupted or partially interrupted, the power source unit 110 may generate a full power energy beam 115A. The power source unit 110 may generate the full power energy beam 115A for a predetermined time interval, or until the beam path is no longer interrupted.

The energy beam 115A and the recollimated energy beams 115B, 115C may not be perfectly collimated, but may be slightly diverging or converging. For example, the first relay unit 120A may project an image of the exit aperture 112 of the power source unit 110 onto an entrance aperture of the second relay unit 120B. Similarly, the second relay unit 120B may project an image of an exit aperture of the first relay unit 120A onto the terminating unit 130. In the schematic optical diagram of FIG. 1, the entrance and exit apertures of the relay units 120A, 120B are essentially the clear apertures of the depicted lenses.

In FIG. 1 and all of the subsequent figures, the size of the units and the optical elements are greatly exaggerated with respect to the length of the beam path between units. For example, the diameter of the energy beams and associated optical elements may be a few meters, and the distance between adjacent units may be hundreds of meters to several kilometers.

Figure 2:
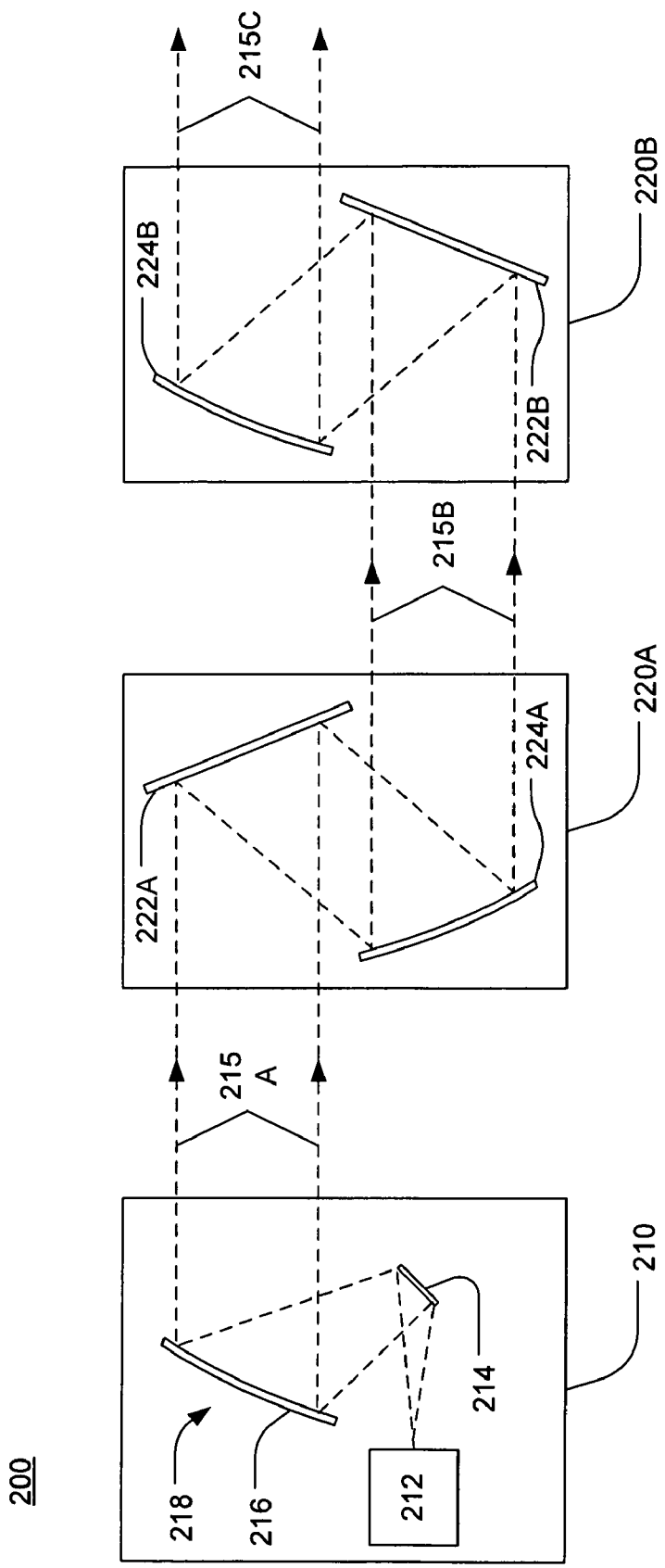
FIG. 2 is a block diagram of a directed energy beam virtual fence.

Referring now to FIG. 2, an exemplary directed energy beam virtual fence 200 may include a source unit 210, a first relay unit 220A, and a second relay unit 220B. The source unit 210 may include a high power millimeter-wave energy source 211 and a beam director 218 to receive the energy from the source 211 and form an energy beam 215A. In this example, the beam director 218 includes a secondary reflector 214 and a primary reflector 216. The beam director 218 may include more or fewer than two reflectors and may include other elements such as lenses, prisms, polarizers, and the like. In the example of FIG. 2, the secondary reflector 214 is shown as a flat reflector, and the primary reflector 216 is shown as a concave curved reflector having optical power. Any or all of the primary reflector 216, secondary reflector 214 and other reflectors, if present, may have optical power. Each reflector having optical power may be spherical, parabolic, ellipsoidal, aspheric, or some other shape. Any or all of the reflectors having optical power may be passive reflect arrays such as, for example, the reflect arrays described in U.S. Pat. No. 4,905, 014.

Each of the relay units 220A, 220B may include a flat reflector 222A, 222B and a curved reflector 224A, 224B. Each relay unit may include more or fewer than two reflectors, at least one of which may have optical power. Each reflector having optical power may be spherical, parabolic, ellipsoidal, aspheric or some other shape. Each reflector having optical power may be a passive reflect array. The relay units 220A, 220B may have the same optical configuration, as shown, or may be different. Each relay unit may have a different optical design dictated by the distances between each relay unit and the adjacent units.

The first relay unit 220A may project an image of an exit aperture of the power source unit 210 onto an entrance aperture of the second relay unit 220B. The second relay unit 220B may project an image of an exit aperture of the first relay unit 210 onto an entrance aperture of a subsequent relay unit (not shown). In the example of FIG. 2, the entrance and exit apertures of the relay unit 220A is approximately equal to the extent of the smaller of the two mirrors 222A and 224A.

Figure 3:
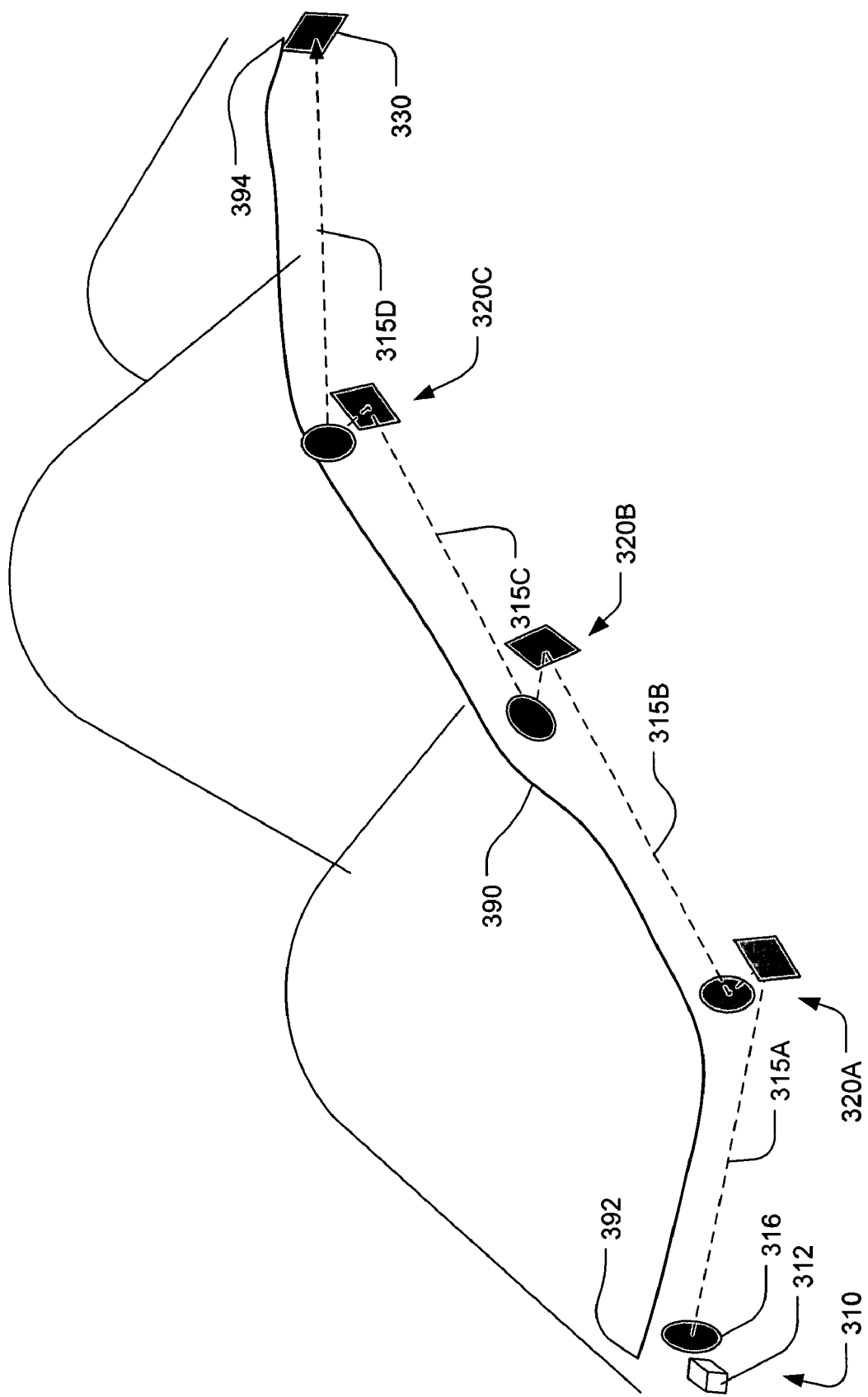
FIG. 3 is a perspective view of an exemplary installation of a directed energy beam virtual fence.

Referring now to FIG. 3, a source unit 310 and a sequence of relay unit 320A, 320B, 320C may be disposed to form a virtual fence to deter an intruder from crossing a boundary 390. The source unit 310 may be disposed near a first end 392 of the boundary 390 and a terminating unit 330 may be disposed near a second end 394 of the boundary 390. The relay units 320A, 320B, 320C may be disposed at intervals along the length of the boundary from 392 to 394. The energy beam may propagate from the source unit 310 to the relay units 320A, 320B, 320C in sequence and then to the terminating unit 330. The energy beam may propagate along a linear path between adjacent units in the sequence. The series of linear beam segments 315A, 315B, 315C, 315D may form a stepped linear approximation to the boundary 390. Due to variations in terrain elevation, the boundary 390 may be a three dimensional contour, and the series of linear beam segments 315A, 315B, 315C, 315D may form a stepped linear approximation to the boundary 390 in three dimensions.

The energy beam 315A provided by the source unit 310 and the recollimated energy beams 315B, 315C, 315D may be considered as segments of a single continuous, essentially uninterrupted, energy beam. For energy beam segments 315A, 315B, 315C, 315D to be effective as a virtual fence, the power density and the width of the beam, along the entire length of the virtual fence, may need to be sufficient to deter an intruder from crossing the beam. The combination of beam power density and beam width may be such that an intruder experiences intolerable pain before the intruder crosses one-half of the beam width, thus compelling the intruder to retreat without successfully crossing the beam.

The power density required to cause pain depends primarily on the wavelength of the energy beam and the duration of exposure, and has been extensively studied. Researchers have reported (WALTERS, T. J., et. al, "Heating and Pain Sensation produced in Human Skin by Millimeter Waves: Comparison to a Simple Thermal Model", Health Physics, vol. 78 no. 3, pp. 259-67, March, 2000) that the median threshold to cause pain may be 3.2, 1.5, and 0.7 watts per square centimeter for exposure to a 94 GHz beam for periods of 1, 3, and 10 seconds, respectively. For energy beam segments 315A, 315B, 315C, 315D to be effective as a virtual fence, the power density may be equal to or higher than the median threshold to cause pain.

For the energy beam 315A, 315B, 315C, 315D to be effective as a virtual fence, the height of the energy beam may need to be sufficient to prevent an intruder from simply jumping or pole-vaulting over the beam. The width of the energy beam must be sufficient to prevent an intruder form running through the beam. Additionally, the virtual fence may need provisions to prevent intruders from crawling, digging, or otherwise sneaking under the energy beam.

Figure 4:
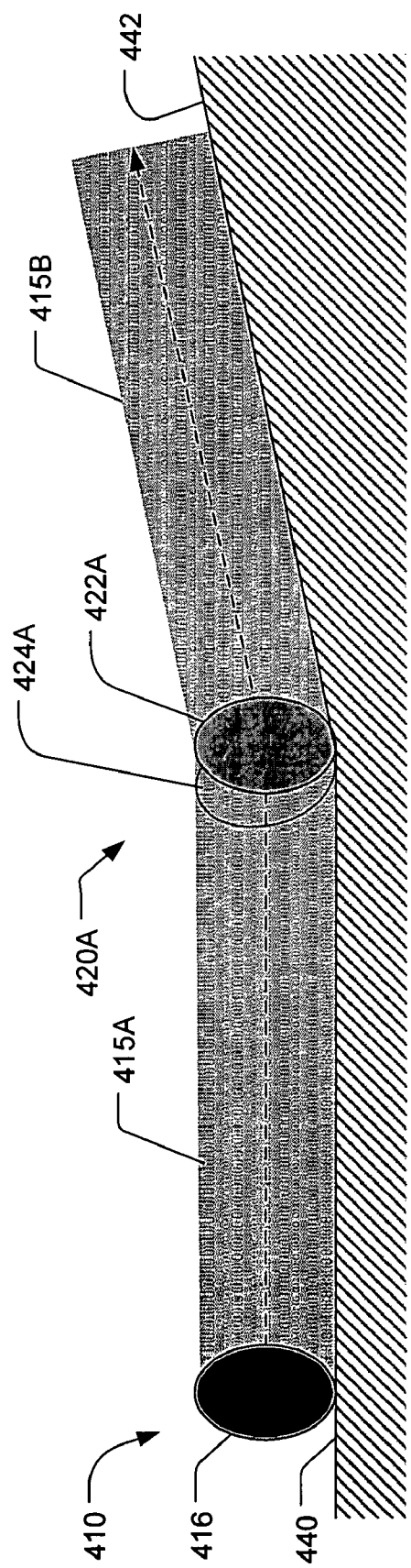
FIG. 4 is a schematic side view of an exemplary directed energy beam virtual fence.

Referring now to FIG. 4, energy beams 415A and 415B, which comprise a portion of a virtual fence, may be proximate to a physical barrier such as the terrain surfaces 440 and 442. In this context, "proximate" is used with the normal meaning of "immediately adjacent to" and is intended to include situations where the energy beam 415A, 415B may partially impinge upon or overlap a physical barrier such as the terrain surfaces 440 and 442.

Since the energy beams 415A, 415B propagate along an essentially linear path, the terrain surfaces 440, 442 may be graded to form flat surfaces to ensure the energy beams are proximate to the terrain surface along the entire beam paths. Additionally, to deter intruders from digging a tunnel or trench under the virtual fence, the graded terrain surfaces 440, 442 may be paved or otherwise reinforced. In some circumstance, an energy beam forming a portion of a virtual fence may be proximate to a water surface rather than a terrain surface.

Figure 5:
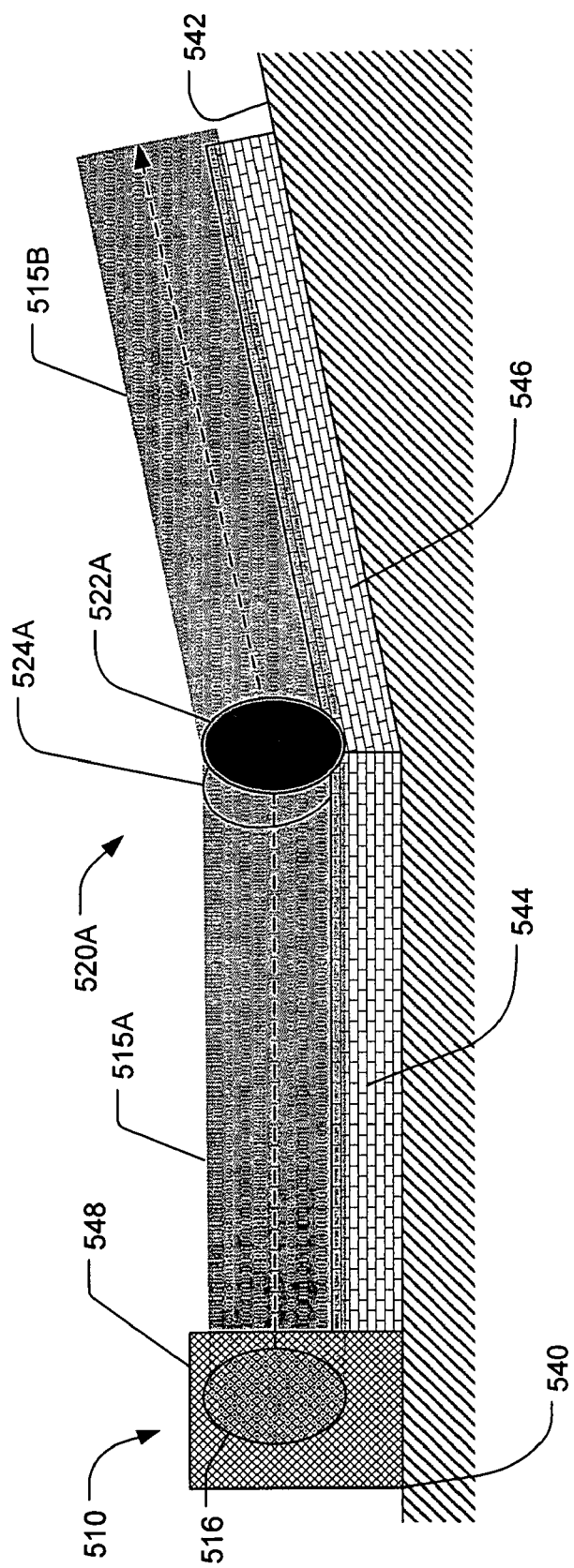
FIG. 5 is a schematic side view of an exemplary directed energy beam virtual fence.

Referring now to FIG. 5, energy beams 515A and 515B, which comprise a portion of a virtual fence, may be proximate to one or more structures such as the depicted block walls 544 and 546. In this context, "structure" is used with the normal meaning of "something constructed" and is intended to include fences, walls, ditches, portions of buildings, and any other man-made structures. A purpose of the structure may me to delay a potential intruder and thus prolong the period of exposure to the energy beam 515A or 515B. Such structures may be above-grade, as illustrated in FIG. 5, or may be partially or completely subterranean.

FIG. 5 also illustrates the source unit 510 enclosed in a security enclosure 548 to prevent unauthorized access and tampering. Any or all of the source unit, relay units, and termination unit may be similarly enclosed. For example, a chain link fence may preclude unauthorized access and still allow entrance and exit of energy beams with little degradation of the beam wave front or power density.

Figure 6:
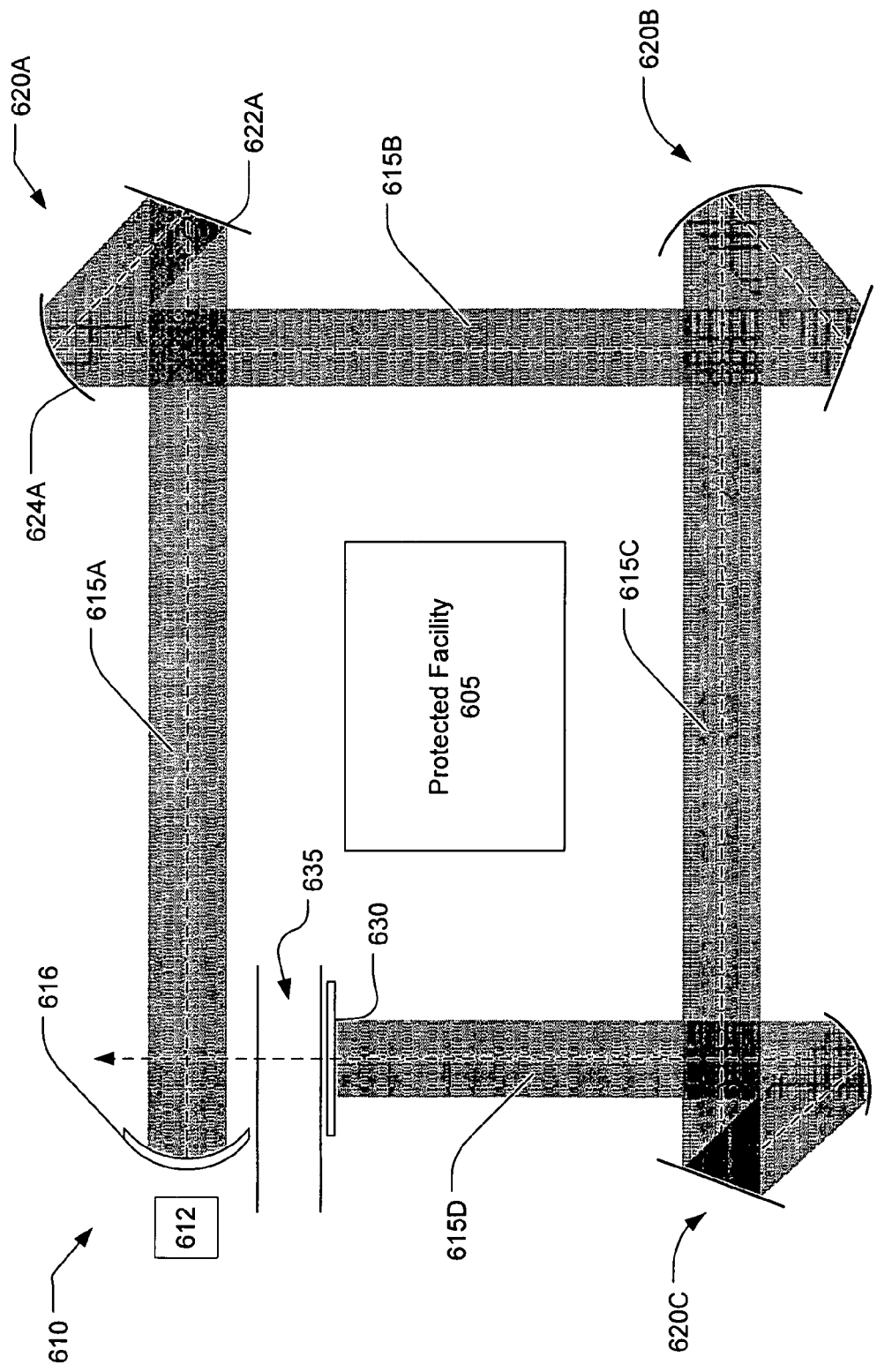
FIG. 6 is a schematic top view of an exemplary directed energy beam virtual fence.

Referring now to FIG. 6, a source unit 610, a series of rely units 620A, 620B, 620C, and a terminating unit 630 may be disposed to form a virtual fence that essentially encloses a protect facility 605. In this context, the term "essentially encloses" is intended to mean the virtual fence forms a perimeter around the protected facility with the exception of one or more predetermined access points such a driveway 635. Such predetermined access points may be protected by other measures such as gates and/or guards. The protected facility 605 may be a building, an airport, a military installation, a power plant, or other facility requiring protection from intruders. The number of relay units required to essentially enclose a protected facility 605 may be more or less than the three relay units 620A, 620B, 620C that are illustrated.

Description of Processes

Figure 7:
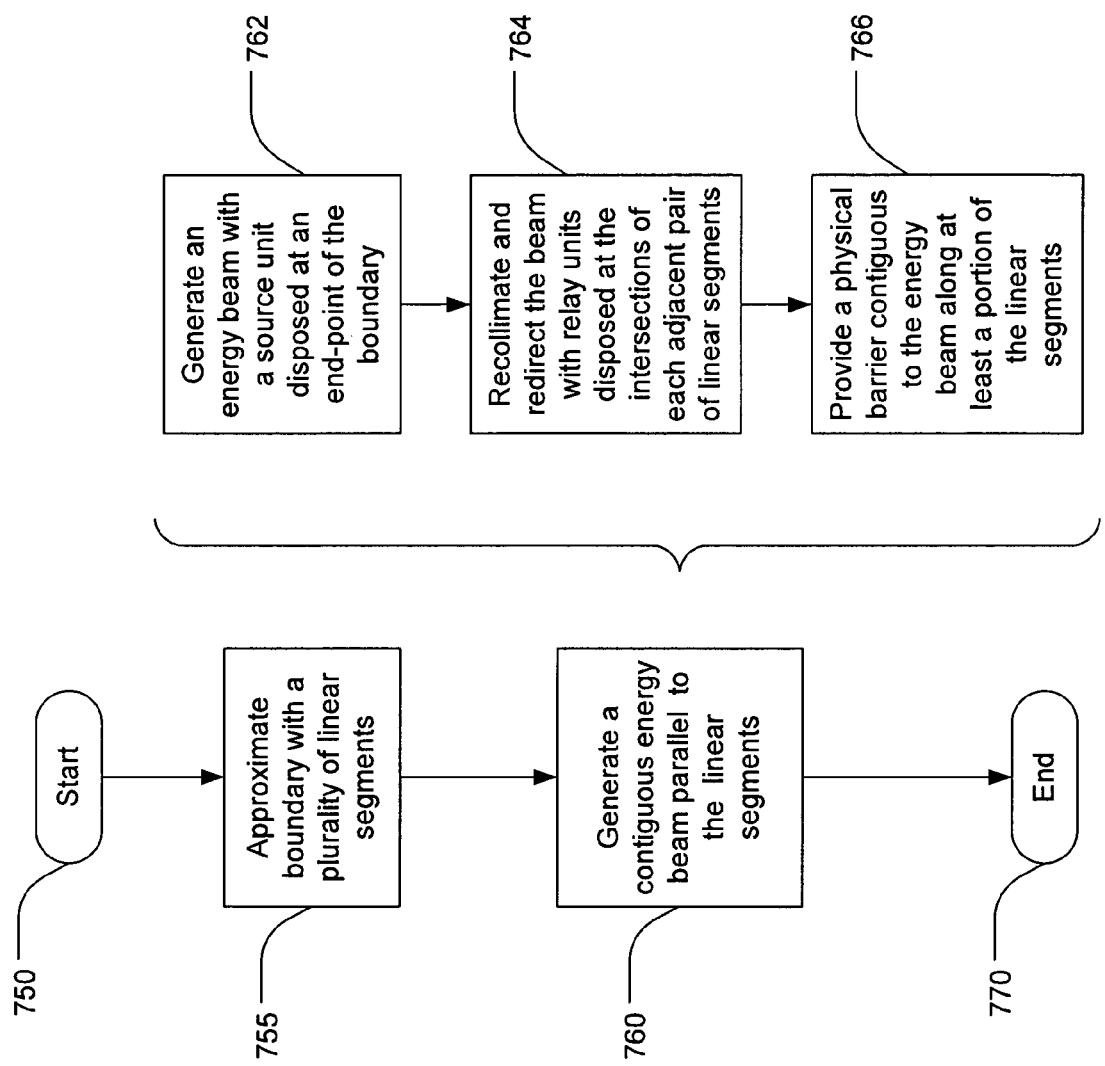
FIG. 7 is a flow chart of a method for deterring intruders from crossing a boundary.

Referring now to FIG. 7, a method of deterring an intruder from crossing a boundary may begin at 750 and conclude at 770. At 755, the boundary may be approximated by a sequence of contiguous linear segments. At 760, an energy beam may be generated and directed to propagate parallel to the contiguous linear segments.

Generating and directing an energy beam parallel to the contiguous linear segments may include generating an energy beam using a source unit disposed near an end-point of the boundary 762. Generating and directing an energy beam may further include recollimating and redirecting the energy beam using a plurality of relay units disposed near the intersections of consecutive linear segments 764. Generating and directing an energy beam may also include providing a physical barrier contiguous to the energy beam along at least a portion of the linear segments 766.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A directed energy beam virtual fence, comprising:
  a high power source of millimeter-wave energy
  a beam director to form the millimeter wave energy from the source into an energy beam, wherein the energy beam has a beam power density sufficient to cause temporary pain to deter an intruder from crossing the virtual fence
  a sequence of relay units disposed at intervals along a length of the virtual fence
  wherein each relay unit in the sequence comprises at least one reflector having optical power and each relay unit is configured to
    receive the energy beam from a previous unit
    recollimate the energy beam
    direct the recollimated energy beam towards a subsequent unit.

2. The directed energy beam virtual fence of claim 1, wherein
  the beam has a frequency about 94 GHz, and
  the beam has an average power density greater than 0.7 watts per square centimeter.

3. The directed energy beam virtual fence of claim 1, further comprising a beam terminating unit to receive the energy beam from a last relay unit in the sequence of relay units.

4. The directed energy virtual beam fence of claim 3, wherein the terminating unit includes one or more sensor to determine if the energy beam has been interrupted.

5. The directed energy beam virtual beam fence of claim 1, wherein the energy beam is proximate to a physical barrier along at least a portion of a length of the virtual fence.

6. The directed energy beam virtual fence of claim 5, wherein the physical barrier is selected from a terrain surface, a terrain surface that has been graded flat, a paved surface, a water surface, a structure, and combinations thereof.

7. The directed energy beam virtual fence of claim 1, wherein a path of the energy beam approximates a predetermined boundary.

8. The directed energy beam virtual fence of claim 1, wherein the energy beam essentially encloses a protected facility.

9. The directed energy beam virtual fence of claim 1, wherein the reflector having optical power is selected from a spherical reflector, a parabolic reflector, an aspheric reflector, and a passive reflect array.

10. The directed energy beam virtual fence of claim 1, wherein each relay unit comprises two or more reflectors.

11. The directed energy beam virtual fence of claim 1, wherein each relay unit essentially projects an image of an exit aperture of the previous unit in the sequence onto an entrance aperture of the subsequent unit in the sequence.

12. A directed energy beam virtual fence comprising:
  a sequence of units, the sequence starting with a source unit and continuing with a plurality of relay units
  the source unit comprising:
    a high power source of millimeter-wave energy
    a beam director to form the millimeter wave energy from the source into an energy beam directed to a first relay unit, wherein the energy beam has a beam power density sufficient to cause temporary pain to deter an intruder from crossing the virtual fence
  each relay unit comprising at least one reflector having optical power and each relay unit configured to
    receive the energy beam from a previous unit in the sequence
    recollimate the energy beam
    redirect the recollimated energy beam towards a subsequent relay unit in the sequence.

13. A directed energy beam virtual fence comprising:
  means for generating a millimeter-wave energy beam having a beam power density sufficient to cause physical pain to deter an intruder from crossing the virtual fence
  plural means for recollimating and redirecting the energy beam disposed at intervals along a length of the virtual fence, each means for recollimating and redirecting including at least one reflector having optical power.

14. A method of deterring intruders from crossing a boundary, comprising:
  generating a high power millimeter-wave energy beam at one end of the boundary, the energy beam propagating along a sequence of linear segments, wherein the sequence of linear segments approximates the boundary
relaying the energy beam at relay units disposed proximate to the intersections of consecutive linear segments, wherein each relay unit comprises at least one reflector having optical power, relaying the energy beam at each relay unit further comprising:
  receiving the energy beam from a previous unit
  recollimating the energy beam
  directing the recollimated energy beam towards a subsequent unit
wherein the energy beam has a beam power density sufficient to cause physical pain to deter an intruder from crossing the boundary.

15. The method of deterring intruders from crossing a boundary of claim 14, further comprising providing a physical barrier proximate to the energy beam along at least a portion of the linear segments.

16. The method of deterring intruders from crossing a boundary of claim 15, wherein the physical barrier proximate to the energy beam is selected from a terrain surface, a terrain surface that has been graded flat, a paved surface, a water surface, a structure, and combinations thereof.

17. The method of deterring intruders from crossing a boundary of claim 14, wherein the energy beam essentially encloses a protected facility.

* * * * *